United States Patent
Demeter et al.

(10) Patent No.: US 11,911,729 B2
(45) Date of Patent: Feb. 27, 2024

(54) 3D PRINTED SPACERS FOR ION-EXCHANGE DEVICE

(71) Applicant: MIS IP Holdings, LLC, Houston, TX (US)

(72) Inventors: Ethan L. Demeter, The Woodlands, TX (US); Michael James Connor, Jr., Porter, TX (US); Chad Unrau, Tomball, TX (US); Brian M. McDonald, Austin, TX (US)

(*) Notice: Subject to any disclaimer, the term of this patent is extended or adjusted under 35 U.S.C. 154(b) by 0 days.

(21) Appl. No.: 18/098,379

(22) Filed: Jan. 18, 2023

(65) Prior Publication Data

US 2023/0149858 A1 May 18, 2023

Related U.S. Application Data

(62) Division of application No. 16/449,951, filed on Jun. 24, 2019, now Pat. No. 11,583,809.

(Continued)

(51) Int. Cl.
*B01D 67/00* (2006.01)
*B29C 64/10* (2017.01)
(Continued)

(52) U.S. Cl.
CPC ....... *B01D 67/0088* (2013.01); *B01D 61/422* (2013.01); *B01D 67/009* (2013.01); *B29C 35/0805* (2013.01); *B29C 64/10* (2017.08); *B29C 64/30* (2017.08); *B33Y 10/00* (2014.12); *B33Y 80/00* (2014.12); *C02F 1/42* (2013.01);
(Continued)

(58) Field of Classification Search
CPC .. B01D 61/422; B01D 2313/14; B33Y 80/00; C02F 1/42
See application file for complete search history.

(56) References Cited

U.S. PATENT DOCUMENTS

| 345,254 A | 7/1886 | Norton et al. |
| 1,305,052 A | 5/1919 | Berkley |
| (Continued) | | |

FOREIGN PATENT DOCUMENTS

| ES | 2390300 | 11/2012 |
| WO | 2017/019542 | 2/2017 |
| WO | 2018/106186 | 6/2018 |

OTHER PUBLICATIONS

Connor et al., U.S. Office Action dated Oct. 3, 2022, directed to U.S. Appl. No. 16/600,416; 14 pages.

(Continued)

*Primary Examiner* — Bradley R Spies
(74) *Attorney, Agent, or Firm* — MORRISON & FOERSTER LLP; Nathan Vogler

(57) ABSTRACT

The present disclosure is directed ion-exchange systems and devices that include composite ion-exchange membranes having 3D printed spacers on them. These 3D printed spacers can drastically reduce the total intermembrane spacing within the system/device while maintaining a reliable sealing surface around the exterior border of the membrane. By adding the spacers directly to the membrane using additive manufacturing, the amount of material used can be reduced without adversely impacting the manufacturability of the composite membrane as well as allow for complex spacer geometries that can reduce the restrictions to flow resulting in less pressure drop associated with the flow in the active area of the membranes.

11 Claims, 9 Drawing Sheets

Related U.S. Application Data

(60) Provisional application No. 62/689,357, filed on Jun. 25, 2018.

(51) Int. Cl.
  B33Y 10/00 (2015.01)
  B33Y 80/00 (2015.01)
  B29C 35/08 (2006.01)
  B29C 64/30 (2017.01)
  B01D 61/42 (2006.01)
  C02F 1/42 (2023.01)
  C02F 1/44 (2023.01)

(52) U.S. Cl.
  CPC ............ *C02F 1/44* (2013.01); *B01D 2313/14* (2013.01); *B29C 2035/0827* (2013.01)

(56) References Cited

U.S. PATENT DOCUMENTS

| | | |
|---|---|---|
| 2,782,337 A | 2/1957 | Robinson |
| 3,993,517 A | 11/1976 | Schneider |
| 5,681,438 A | 10/1997 | Proulx |
| 2003/0090270 A1 | 5/2003 | Lagmanson |
| 2004/0011723 A1 | 1/2004 | Bradford et al. |
| 2005/0051485 A1 | 3/2005 | Saini |
| 2008/0029395 A1 | 2/2008 | Fan |
| 2010/0078327 A1 | 4/2010 | Noh et al. |
| 2010/0308842 A1 | 12/2010 | Coster et al. |
| 2011/0034069 A1 | 2/2011 | Jacob |
| 2012/0181890 A1 | 7/2012 | Kleber et al. |
| 2012/0318724 A1 | 12/2012 | Brown |
| 2013/0341264 A1 | 12/2013 | Kidwell |
| 2015/0376036 A1 | 12/2015 | Kedem et al. |
| 2016/0008763 A1 | 1/2016 | Roderick et al. |
| 2016/0333287 A1 | 11/2016 | Zou et al. |
| 2017/0029586 A1 | 2/2017 | Van Engelen et al. |
| 2018/0093030 A1 | 4/2018 | Hestekin |
| 2018/0141834 A1 | 5/2018 | Wessling et al. |
| 2019/0015784 A1 | 1/2019 | Cantrell |
| 2019/0111393 A1 | 4/2019 | Winter et al. |
| 2019/0143275 A1 | 5/2019 | Arnusch et al. |
| 2020/0114314 A1 | 4/2020 | Connor, Jr. et al. |
| 2020/0306697 A1 | 10/2020 | Kutowy et al. |
| 2022/0143554 A1 | 5/2022 | Ghaffour et al. |

OTHER PUBLICATIONS

Demeter et al., U.S. Office Action dated Jun. 13, 2022, directed to U.S. Appl. No. 16/449,951; 10 pages.

Dolezel et al. (Jul. 21, 2017). "Measurement of Non-Effective Electric Current in Electrodialysis Stacks," Journal of The Electrochemical Society 164(9): E276-E282.

International Preliminary Report on Patentability dated Dec. 29, 2020, directed to International Application No. PCT/US2019/038751; 8 pages.

International Search Report and Written Opinion dated Oct. 3, 2019, directed to International Application No. PCT/US19/38751; 12 pages.

Murray, P. ed. (1995). "Electrodialysis and Electrodialysis Reversal: Manual of Water Supply Practices," American Water Works Association; 63 pages.

Siddiqui et al. (2016). "Development and Characterization of 3D-Printed Feed Spacers for Spiral Wound Membrane Systems," Water Research: 22 pages.

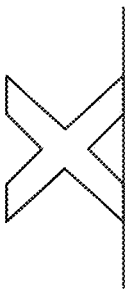
FIG. 6A
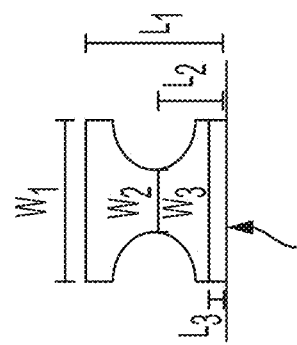
FIG. 6C
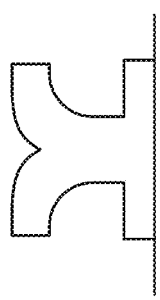
FIG. 6B
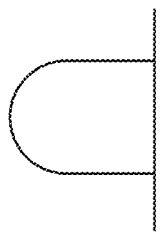
FIG. 6D
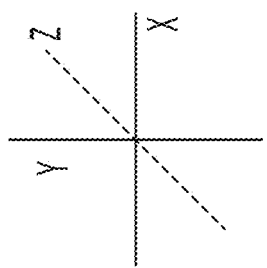

3D PRINTED SPACERS FOR ION-EXCHANGE DEVICE

CROSS REFERENCE TO RELATED APPLICATIONS

This application is a divisional of U.S. application Ser. No. 16/449,951, filed Jun. 24, 2019, which claims the benefit of U.S. Provisional Application No. 62/689,357, filed Jun. 25, 2018, the entire contents of each of which are incorporated herein by reference.

FIELD OF THE DISCLOSURE

This disclosure relates to membrane spacers for an ion-exchange device. More specifically, this disclosure relates to 3D printed spacers for use in an ion-exchange water treatment system.

BACKGROUND OF THE DISCLOSURE

The earliest forms of large scale desalination were thermal methods such as thermal distillation where the water is boiled and converted into steam, leaving behind the impurities, and then the clean steam is collected and condensed. Unfortunately, this is a very energy intensive operation. In order to reduce the energy consumption, membrane based methods were created such as electro-chemical based electrodialysis and pressure driven reverse osmosis. In both of these methods, the water is purified through a membrane which allows the system to create potable water at a much reduced energy consumption.

Electrodialysis can be used to selectively remove positive and negative ions from a water source (e.g., brackish water or the brine solution produced in reverse osmosis units) through transportation of salt ions from one solution to another via ion-exchange membranes upon application an electrical current. An electrodialysis device can include a pair of electrodes (where a voltage is applied to initiate an electrochemical reaction), alternating anionic and cationic exchange membranes (which can selectively separate ions from one stream while concentrating said ions in adjacent streams from a dilute solution feed stream to a concentrate stream), and spacer materials. These spacers can be placed between the ion exchange membranes. The primary function of these spacers is to create turbulence in the flow field and to restrict the membranes from contacting one another.

Unfortunately, the electrical energy required to transport ions from one stream to another is a function of the resistance of the system via Ohm's law ($V=i*R$), where V is the electrical potential, i is the current density, and R is the resistance. The resistance of the system can be impacted by both the conductivity of the water in the unit (K) (which consequently decreases as the ions are removed), and the spacer thickness (L). Specifically, the resistance scales linearly with the intermembrane spacing as seen by the following equation: $R=K^{-1}*L$.

In a typical electro-chemical desalination device, the two electrodes can sandwich upwards of 1000 pairs of membranes and spacers. Thus, these components and the water filling them can make up a significant portion of the resistance in the device.

BRIEF SUMMARY OF THE DISCLOSURE

Applicants have discovered spacers and methods for preparing these spacers that can reduce the resistance of the spacers between the membranes. Specifically, Applicants have discovered how to minimize the spacing between the alternating cationic and anionic exchange membranes in an electrodialysis-like device. Minimizing the spacer spacing can reduce the resistance in the device, thereby reducing the energy consumption.

Typical spacers are on the order of 500-600 microns thick. Making a spacer thinner than this can be problematic for at least two reasons: (1) the pressure drop through the active area (area that is directly between the electrodes through which an electrical current may be passed) can become too high; and (2) the material that the spacer is made out of can be difficult to handle when it is thinner leading to manufacturability issues. Furthermore, as the spacer becomes thinner, it can become a less reliable sealing surface.

The pressure drop is a function of the height of the flow channel, and thus going to a thinner spacing can make the pressure drop greater. On top of this, adding a spacer in the flow field can act as an obstruction to the flow. Thus, Applicants discovered a spacer for a given flow channel height, which can serve both to reliably separate the membrane and to still allow adequate flow. As an example in this space, woven materials are often chosen as a spacer material. However, as the wire diameters become smaller, the weave necessarily must become tighter. Therefore, a weave with a nominal height of 500 microns could have an open area of >65%, while a weave with a nominal height of 250 microns would only have an open area of ~50%. In addition, handling ability can become a critical issue to manufacturability. As the material becomes thinner, it can become less durable, more likely to crease, snag, and tear. Considering a stack of 1000 membrane pairs would have 2000 spacers, these issues are magnified.

Furthermore, typical EDR stacks can utilize an elastomeric material for the spacer border in which the elastomeric properties provide a good seal but can degrade the consistency of flow channel thicknesses. This is due to the fact that elastomerics are compressible, so they seal well, but have greater thickness and flatness variances, magnified by the fact that there are upwards of 1000 pairs of these all in compression. In contrast, Applicants, in some embodiments, used a rigid and very flat PET spacer border for the sealing surface which can provide good stackup tolerances and consistent flow channel thicknesses. In order for them to seal well, Applicants can apply 500 to 1500 psi of pressure using our compression plates and utilize the membranes slight compressibility to mitigate stackup tolerance issues.

Applicants have discovered advanced manufacturing techniques, such as additive manufacturing (i.e., 3D printing) to make composite ion exchange membrane and spacers, wherein the total intermembrane spacing can be reduced drastically (e.g., about 10-250 microns) while maintaining a reliable sealing surface around the exterior border. This technique can solve the previously mentioned problems by first reducing the amount of material necessary to serve as intermembrane spacers. Minimizing the amount of material used in the intermembrane spacers can reduce the restrictions to flow resulting in less pressure drop associated with the flow in the active area and increase the membrane active area resulting in more efficient ion transfer.

A conventional spacer requires additional material to provide rigidity during installation. In contrast, by adding the spacers directly to the membrane using automated additive manufacturing devices, the amount of material used can be reduced without adversely impacting the manufacturability of the composite membrane (i.e., membrane plus spacers). In fact, handling of these composite membranes can be easier because the number of components that needs to be stacked can be reduced.

In addition to improved manufacturability, additive manufacturing techniques can allow for the creation of shapes, features, and patterns of spacers that other processes and conventional spacers do not readily allow. These shapes, features, and patterns formed with 3D printing techniques can be engineered to improve hydrodynamics and respond to varying conditions imposed on the device to further reduce the hydraulic and electrical resistance of the ion-exchange device.

In some embodiments, an ion exchange membrane includes a plurality of 3D printed spacers adhered to a surface of the ion exchange membrane, wherein the plurality of 3D printed spacers have the following properties: a first width $W_1$ at a first distance $L_1$ from the membrane surface, a second width $W_2$ at a second distance $L_2$ from the membrane surface, $W_1 > W_2$, and $L_1 > L_2$. In some embodiments, the plurality of 3D printed spacers have the following additional properties: a third width $W_3$ at a third distance $L_3$ from the membrane surface, $W_3 > W_2$, and $L_3 < L_2$. In some embodiments, the plurality of 3D printed spacers have a height of 10-1000 microns. In some embodiments, the plurality of 3D printed spacers have a height of 10-250 microns. In some embodiments, an area of the surface of the ion exchange membrane covered by the plurality of 3D printed spacers is 1-20% of total surface area of the surface of the ion exchange membrane. In some embodiments, a volume of the plurality of 3D printed spacers is less than a theoretical maximum volume of the plurality of 3D spacers defined by multiplying a maximum width of the spacers in a x direction by a maximum height of the spacers in a y direction and by a maximum depth of the spacers in a z direction. In some embodiments, the volume of the plurality of 3D printed spacers is less than 95% of the theoretical maximum volume of the plurality of 3D spacers. In some embodiments, a second plurality of 3D printed spacers on a surface of the ion exchange membrane opposite the surface with the first plurality of 3D printed spacers. In some embodiments, the ion exchange membrane is a cation exchange membrane or an anion exchange membrane. In some embodiments, the plurality of 3D printed spacers have the following additional properties: a first depth $D_1$ at a first distance $LD_1$ from the membrane surface, a second depth $D_2$ at a second distance $LD_2$ from the membrane surface, $D_1 > D_2$, and $LD_1 > LD_2$.

In some embodiments, a method of forming an ion exchange membrane includes 3D printing a plurality of curable spacers on a surface of the ion exchange membrane; and curing the plurality of curable 3D printed spacers to form a plurality of 3D printed spacers on the surface of the ion exchange membrane, wherein the plurality of 3D printed spacers have the following properties: a first width $W_1$ at a first distance $L_1$ from the membrane surface, a second width $W_2$ at a second distance $L_2$ from the membrane surface, $W_1 > W_2$, and $L_1 > L_2$. In some embodiments, the plurality of curable 3D printed spacers is cured by electromagnetic radiation or thermal exposure. In some embodiments, the electromagnetic radiation is ultraviolet light. In some embodiments, the plurality of 3D printed spacers have the following additional properties: a third width $W_3$ at a third distance $L_3$ from the membrane surface, $W_3 > W_2$, and $L_3 < L_2$. In some embodiments, the plurality of 3D printed spacers have a height of 10-1000 microns. In some embodiments, the plurality of 3D printed spacers have a height of 10-250 microns. In some embodiments, an area of the surface of the ion exchange membrane covered by the plurality of 3D printed spacers is 1-20% of total surface area of the surface of the ion exchange membrane. In some embodiments, a volume of the plurality of 3D printed spacers is less than a theoretical maximum volume of the plurality of 3D spacers defined by multiplying a maximum width of the spacers in a x direction by a maximum height of the spacers in a y direction and by a maximum depth of the spacers in a z direction. In some embodiments, the volume of the plurality of 3D printed spacers is less than 95% of the theoretical maximum volume of the plurality of 3D spacers. In some embodiments, the method includes 3D printing a second plurality of curable spacers on a surface of the ion exchange membrane opposite the surface with the first plurality of 3D printed spacers and curing the second plurality of curable 3D printed spacers to form a second plurality of 3D printed spacers on the surface of the ion exchange membrane opposite the surface with the first plurality of 3D printed spacers. In some embodiments, the ion exchange membrane is a cation exchange membrane or an anion exchange membrane.

In some embodiments, an ion-exchange device includes a pair of electrodes comprising an anode and a cathode; a first ion exchange membrane and a second ion exchange membrane between the pair of electrodes, wherein at least one of the first or second ion exchange membranes includes a plurality of 3D printed spacers adhered to a surface of the at least one of the first or second ion exchange membranes such that an intermembrane spacing between surfaces of the first and second ion exchange membranes is 10-1000 microns, and wherein the plurality of 3D printed spacers have the following properties: a first width $W_1$ at a first distance $L_1$ from the membrane surface, a second width $W_2$ at a second distance $L_2$ from the membrane surface, $W_1 > W_2$, and $L_1 > L_2$. In some embodiments, the first ion exchange membrane is a cation exchange membrane and the second ion exchange membrane is an anion exchange membrane. In some embodiments, the plurality of 3D printed spacers comprise a third width at a third distance from the surface of the at least one of the first or second ion exchange membranes, wherein the third width is greater than the second width and the third distance is less than the second distance. In some embodiments, an area of the surface of the at least one of the first or second ion exchange membranes covered by the plurality of 3D printed spacers is 1-20% of total surface area of the surface of the at least one of the first or second ion exchange membranes. In some embodiments, the plurality of 3D printed spacers have the following additional properties: a first depth $D_1$ at a first distance $LD_1$ from the membrane surface, a second depth $D_2$ at a second distance $LD_2$ from the membrane surface, $D_1 > D_2$, and $LD_1 > LD_2$.

Additional advantages will be readily apparent to those skilled in the art from the following detailed description. The examples and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE FIGURES

Exemplary embodiments are described with reference to the accompanying figures, in which:

FIG. 6A illustrates an example of a side view of a 3D printed spacer disclosed herein.

FIG. 6B illustrates an example of a side view of a 3D printed spacer disclosed herein.

FIG. 6C illustrates an example of a side view of a 3D printed spacer disclosed herein.

FIG. 6D illustrates an example of a side view of a 3D printed spacer disclosed herein.

DETAILED DESCRIPTION OF THE DISCLOSURE

The ion-exchange systems and devices disclosed herein include composite ion-exchange membranes that have 3D printed spacers on them. These 3D printed spacers can drastically reduce the total intermembrane spacing within the system/device while maintaining a reliable sealing surface around the exterior border of the membrane. By adding the spacers directly to the membrane using additive manufacturing, the amount of material used can be reduced without adversely impacting the manufacturability of the composite membrane.

In addition, additive manufacturing techniques can allow for the creation of shapes, features, and patterns of spacers that other processes and conventional spacers do not readily allow. These shapes, features, and patterns can be engineered to improve hydrodynamics and respond to varying conditions imposed on the device to further reduce the hydraulic and electrical resistance of the ion-exchange device.

The ion-exchange systems and devices disclosed herein can include at least one pair of electrodes and at least one pair of ion exchange membranes placed there between. The at least one pair of ion exchange membranes can include a cation exchange membrane and an anion exchange membrane. In addition, at least one of the cation exchange membrane and anion exchange membranes has spacers on the surface facing the other exchange membrane in the ion exchange system/device. In some embodiments, both the cation exchange membranes and the anion exchange membranes have spacers on at least one surface facing the other exchange membrane.

Figure 1:
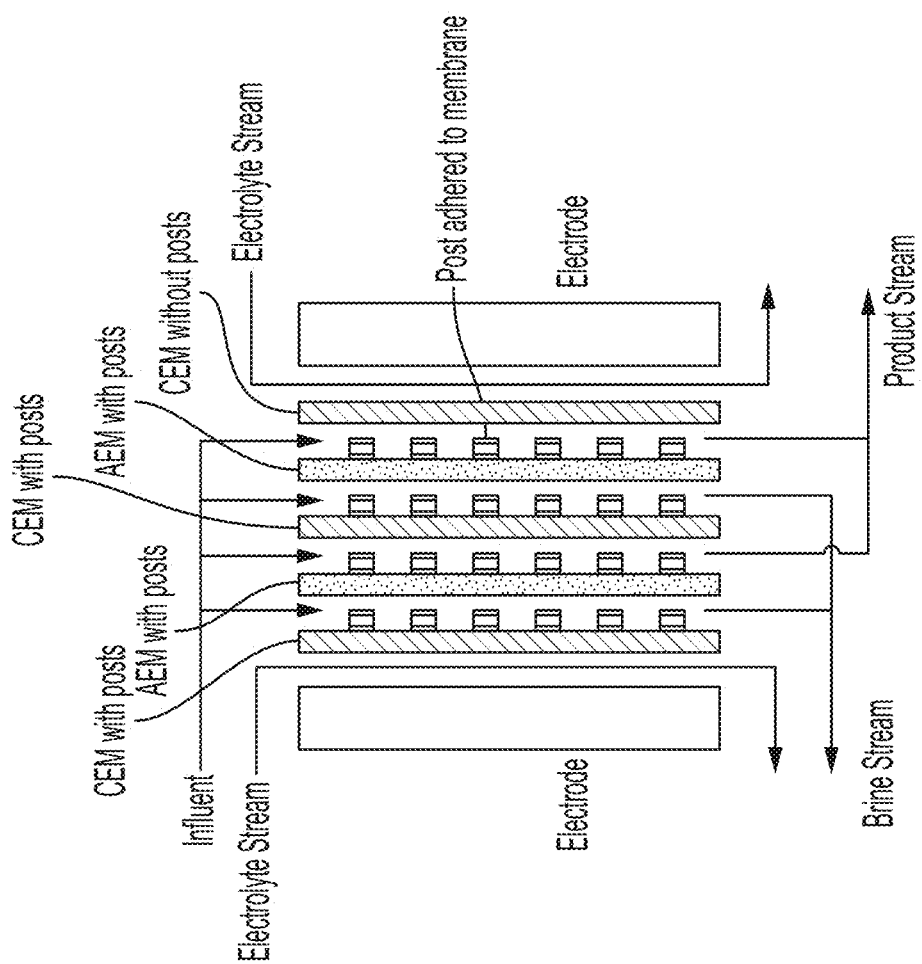
FIG. 1 illustrates an example of a schematic side view of an ion-exchange system disclosed herein.
Figure 3:
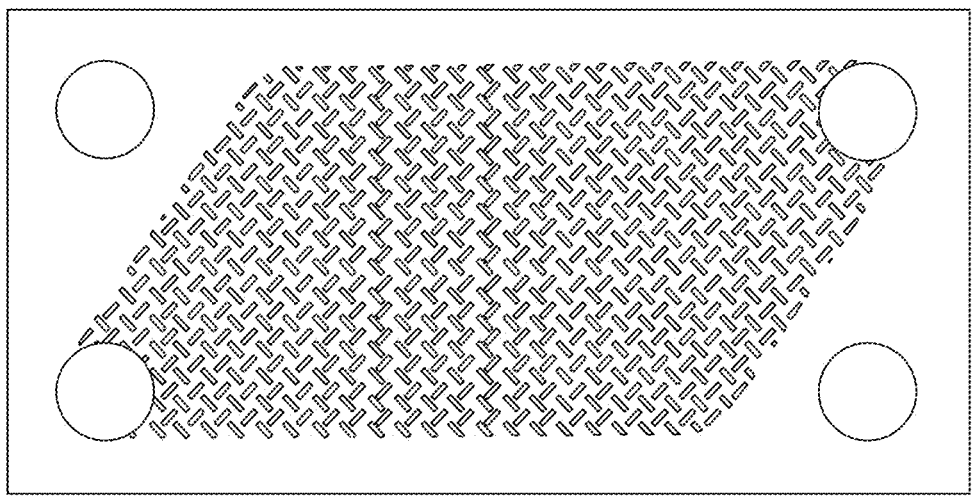
FIG. 3 illustrates an example of a top view of an ion exchange membrane with adhered spacers.
Figure 4:
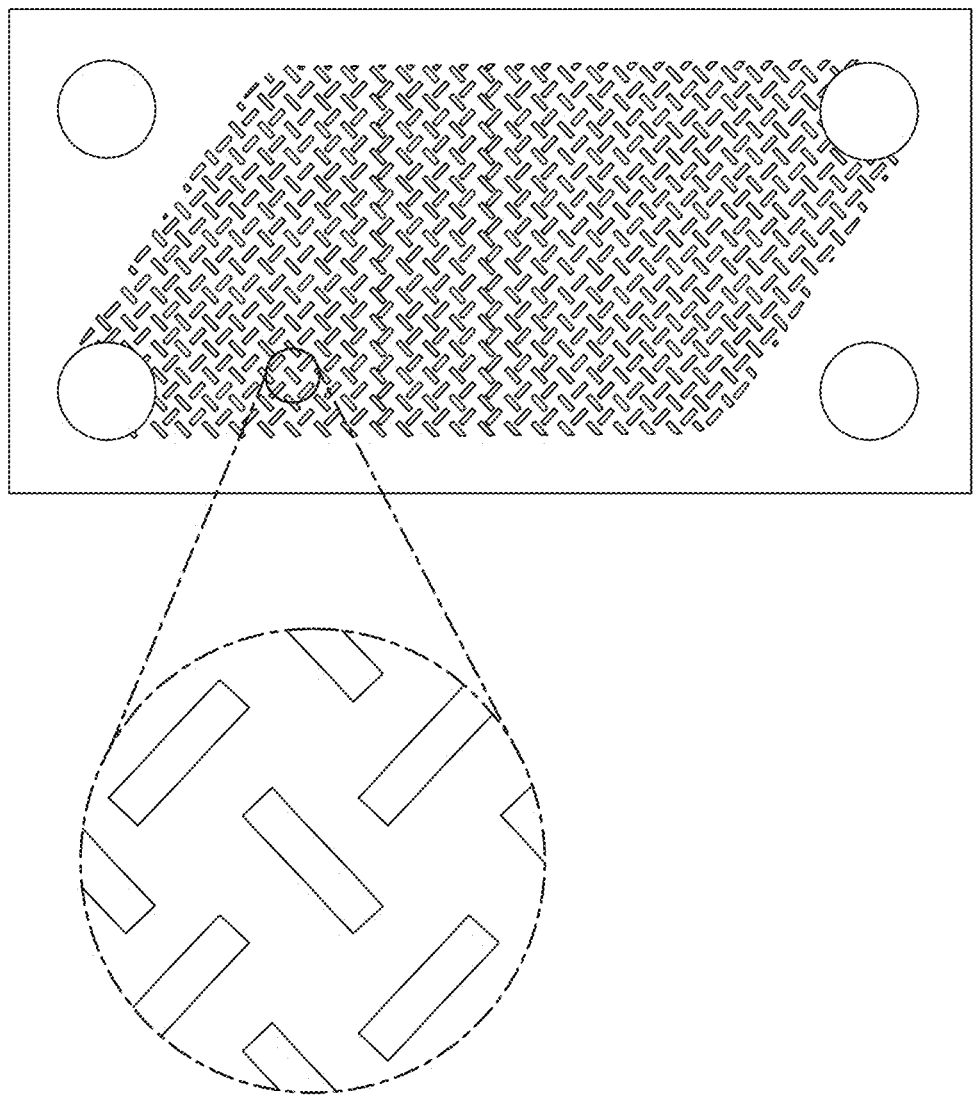
FIG. 4 illustrates an example of a top view of a close up of the spacers adhered to the ion exchange membrane.

FIG. 1 illustrates an example of a schematic side view of an ion-exchange system disclosed herein. As shown in FIG. 1, cation exchange membranes ("CEMs") and anion exchange membranes ("AEMs") can include spacers (also referred to as posts) on at least one surface of the ion exchange membrane. FIG. 3 illustrates an example of a top view of an ion exchange membrane with adhered spacers to a surface of the ion exchange membrane. In addition, FIG. 4 illustrates an example of a top view of a close up of spacers adhered to the ion exchange membrane. In some embodiments, the exchange membranes can have spacers on both surfaces of the exchange membrane. In addition, the ion-exchange systems disclosed herein can have spacers between two adjacent membranes (i.e., between an anion exchange membrane and a cation exchange membrane). As such, the spacers are used to separate the exchange membranes as shown in FIG. 1.

The system shown in FIG. 1 also includes two electrodes on opposite ends of the device. One electrode can be a cathode and the other electrode can be an anode. These electrodes can encompass a series of fluid channels. These fluid channels can be separated by the ion exchange membranes (e.g., cation exchange membrane and anion exchange membrane). At least some of these fluid channels can receive an influent stream. The influent stream can be water to be purified and can be flowed through the channels in between the alternating anionic and cationic exchange membranes. Anion exchange membranes can preferentially allow passage of negatively charged ions and can substantially block the passage of positively charged ions. In contrast, cation exchange membranes can preferentially allow the passage of positively charged ions and can substantially block the passage of negatively charged ions.

The electrolyte fluid channels and streams can be in direct contact with the electrodes. In addition, these electrolyte streams may include the same or different fluid as the fluid entering the influent. For example, the electrolyte streams can be a variety of conductive fluids including, but not limited to, raw influent, a separately managed electrolyte fluid, NaCl solution, sodium sulfate solution, or iron chloride solution.

In an ion exchange system such as the one shown in FIG. 1, when an electric charge is applied to the electrodes, the ions in the influent stream flowing in the channels between the ion exchange membranes can migrate towards the electrode of opposite charge. The alternating arrangement of the ion exchange membranes can thus produce alternating channels of decreasing ionic concentration and increasing concentration. The number of channels between the ion exchange membranes may be increased through the addition of more alternating pairs of membranes to increase the capacity of the ion exchange system/device. In addition, the functioning ability of an individual ion exchange cell can be greatly augmented by configuring ion exchange cells into ion exchange stacks (i.e., a series of multiple ion exchange cells.)

The influent stream can be converted into a brine stream which is typically waste and a product/diluate stream. The product stream can have a lower ionic concentration. In some embodiments, the product stream can have a predetermined treatment level. For example, the ion exchange system can remove many types of ions or it could focus or be selective to a specific ion type. Examples of groups of ions can include, but are not limited to, monovalent and divalent.

Figure 2:
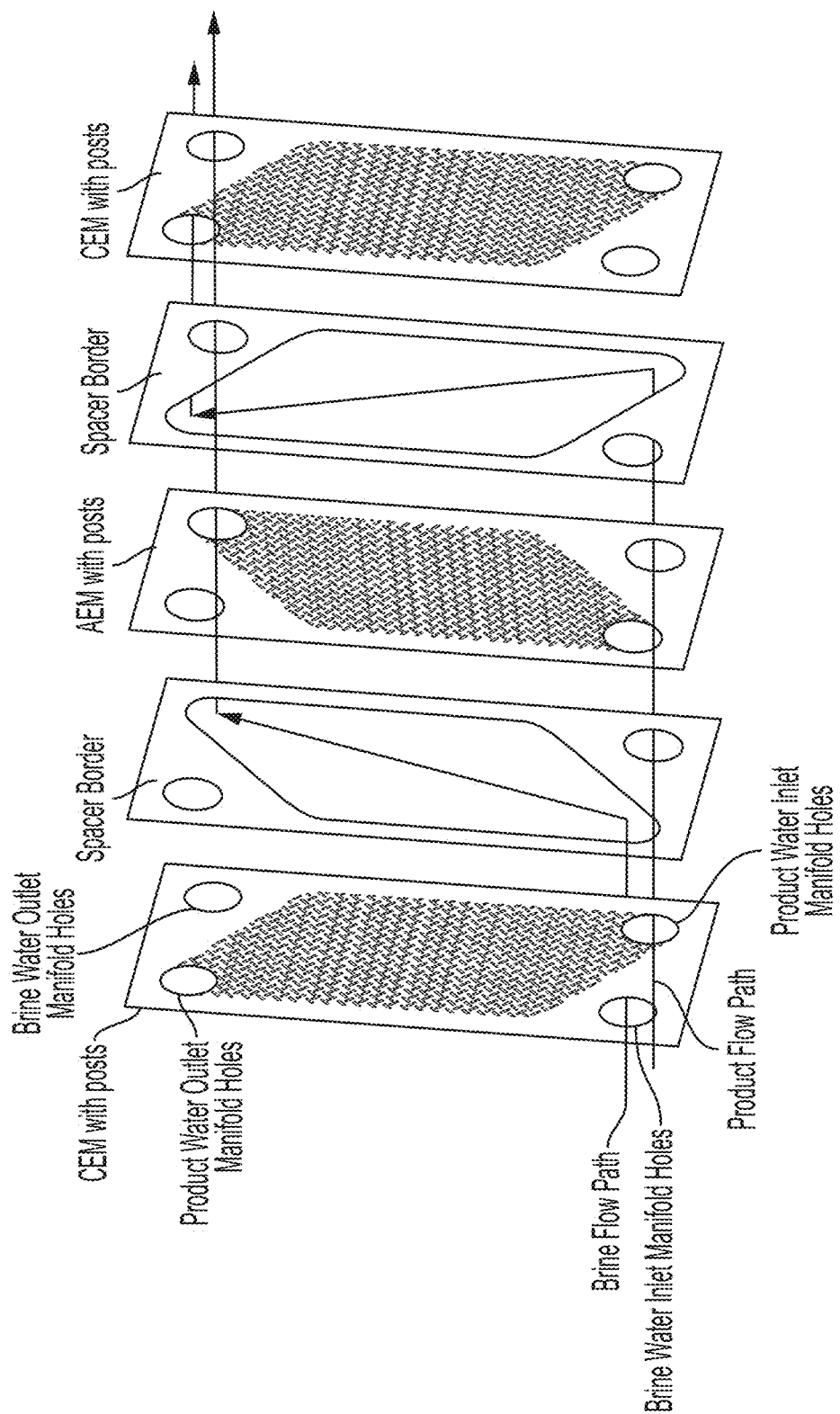
FIG. 2 illustrates an example of an exploded view of the flow channels through an ion-exchange system disclosed herein.
Figure 5:
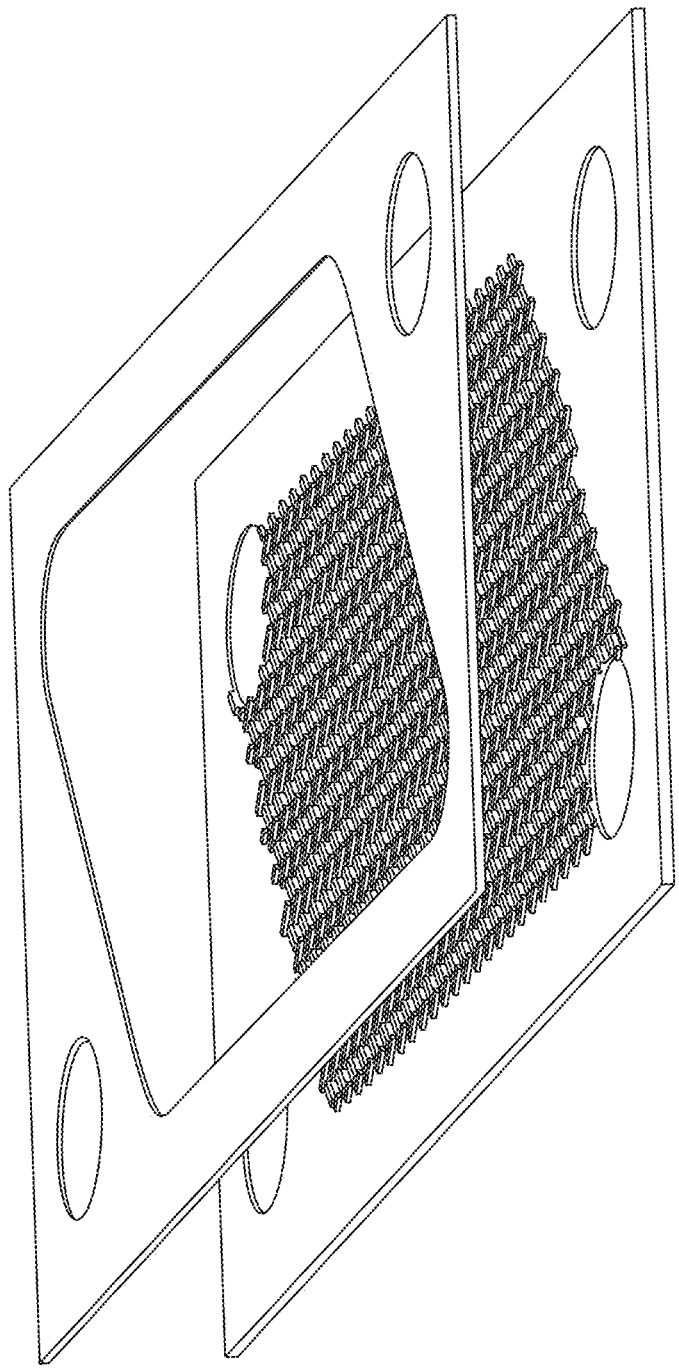
FIG. 5 illustrates an example of an isometric view showing how a spacer border fits together with an ion exchange membrane.
Figure 7A:
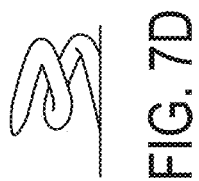
FIG. 7A illustrates an example of a side view of a 3D printed spring-like spacer disclosed herein.
Figure 7B:
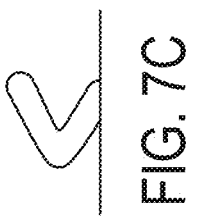
FIG. 7B illustrates an example of a side view of a 3D printed spring-like spacer disclosed herein.
Figure 7C:
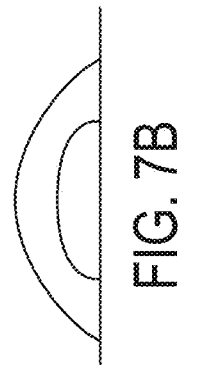
FIG. 7C illustrates an example of a side view of a 3D printed spring-like spacer disclosed herein.
Figure 7D:
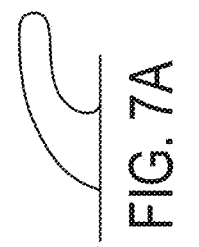
FIG. 7D illustrates an example of a side view of a 3D printed spring-like spacer disclosed herein.

To create the fluid channels between the membranes, spacer borders can be inserted between the membranes. FIG. 2 illustrates an exploded view of three membranes and two spacer borders as well as the fluid flow path through these components. Specifically, the fluid flow path is shown to be sequentially cation exchange membrane, spacer border, anion exchange membrane, spacer border, and cation exchange membrane. In actual use, these components can be sandwiched together such that the spacer border can seal against the membranes and provide contained flow channels/pathways for the fluid to be treated. For example, FIG. 5 illustrates an example of an isometric view showing how a spacer border fits together with an ion exchange membrane. When these components are sandwiched together, the holes in the corners of the various components shown in FIG. 2 can create inlet and outlet manifolds. In addition, the 3D printed spacers on the ion exchange membranes can provide torturous paths for the fluid to flow that can increase the turbulence of the fluid flow, but minimize unnecessary pressure drop. The pressure drop can be minimized compared to conventional woven mesh or extruded netting spacers by eliminating the cross members that connect the nodes of these parts. As the 3D printed spacers are connected directly to the membrane, there can be no need for interconnecting parts Eliminating this feature can present less obstruction in the flow path and may subsequently reduce the pressure drop. The manifold holes and the geometry of the adhered spacers can allow the water to flow into and through the contained area created by the spacer border. In some embodiments, the outer sealing surface outside of the active area of the ion-exchange membrane can also be 3D printed directly on the membrane. As such, three individual components (the ion exchange membrane, the spacers, and the spacer border) can effectively be combined into a single composite membrane, thereby significantly reducing the complexity of stacking membranes into a device.

As stated above, FIG. 4 illustrates a close up view of an ion exchange membrane with adhered spacers. In some embodiments, the spacers can be non-conductive spacers, conductive spacers, or have special ion separation properties. The spacers shown in FIG. 4 are rectangular (i.e., rectangular blocks) and evenly patterned through the surface of the membrane. However, the geometry of the spacers can be different such as circles (i.e., cylinders), diamonds, or combinations of numerous shapes. Furthermore, the pattern can alternatively be spaced further apart or closer together depending on the fluid treatment specifications. In addition, the pattern and/or geometry (i.e., 3 dimensional shape) of the spacers can be modified throughout the flow path to provide the greatest turbulence with the minimum pressure drop. This can be quantified using limiting current density with similar 3D printed patterns (one intended to create greater mixing than the other). Limiting current density can increase with greater induced turbulence by shrinking the diffusion boundary layer.

By adding the spacers directly to the ion exchange membranes, the total amount of material used for the spacers can be reduced. This can substantially reduce the shadowing effect compared to when using traditional spacers. The shadowing effect is a result of a non-conductive spacer blocking (i.e., shadowing) the natural flow of ions resulting from the imposed electric field. In addition, reducing the amount of spacer material can reduce the amount of flow obstruction. In turn, this can allow for a narrower intermembrane spacing for a similar applied pressure. Smaller intermembrane spacing can be desirable because the amount of voltage required to drive the ion separation is directly correlated to the resistance of the water to be treated. Given that resistivity is dependent upon path length, the smaller the intermembrane spacing, the lower the total resistance. In some embodiments, the spacers are such that the spacing between ion exchange membranes can be about 10-1000 microns, about 10-250 microns, or about 75-250 microns. In some embodiments, the spacers are such that the spacing between ion exchange membranes can be less than about 1000 microns, about 500 microns, about 250 microns, about 100 microns, about 50 microns, about 25 microns, about 15 microns, or about 10 microns.

In summation, there can be two primary drivers of energy consumption for an electrochemical ion exchange device: (1) the electrical energy required to drive the ion separation; and (2) the hydraulic energy required to move the water through the device. Thus, 3D printing spacers on the ion exchange membranes can greatly reduce the intermembrane spacing and thus the electrical energy consumed while also reducing the amount of hydraulic energy consumed in the flow field by reducing the amount of spacer material from the spacer.

The spacer itself can be made from a curable polymer solution which can be applied to an ion exchange membrane by Additive Manufacturing (i.e., 3D Printing) in a desired shape and pattern. 3D printing can allow for a simplified manufacturing process over traditional spacer manufacturing processes such as screen-printing. For example, 3D printing can eliminate excess material used for the spacers or molds required to impart a desired shape. Additionally, by eliminating the need for a mold, 3D printing can remove various cleaning steps and/or waste/maintenance associated with damage to the molds.

Another important benefit of 3D printing is that it can allow for the manufacture of more complex shapes and patterns which cannot be produced via previously described spacer formation methods such as screen-printing. For example, FIGS. 6A-D illustrate examples of a side view of 3D printed spacers disclosed herein. As shown in FIGS. 6A-D, the spacers have reduced material (i.e., less volume) compared to traditional spacers. The spacers can have a maximum width in the x direction (i.e., x axis), a maximum height in the y direction (i.e., y axis), and a maximum depth in the z direction (i.e., z axis). In some embodiments, the 3D printed spacers can have volume that is less than a theoretical maximum volume defined by the maximum width multiplied by the maximum height multiplied by the maximum depth (i.e., Max Theoretical Volume=max width×max height×max depth). In some embodiments, the volume of the spacer can be less than about 95%, about 90%, about 85%, about 80%, about 75%, about 70%, about 65%, about 60%, about 55%, about 50%, about 45%, or about 40% of the theoretical maximum volume of the spacer.

In some embodiments, the height of the spacers can be about 10-1000 microns, about 10-250 microns, or about 75-250 microns. In some embodiments, the height of the spacers can be less than about 1000 microns, about 500 microns, about 250 microns, about 100 microns, about 50 microns, about 25 microns, about 15 microns, or about 10 microns. In some embodiments, the width of the spacers can be less than or equal to about 100 microns, about 90 microns, about 80 microns, about 70 microns, about 60 microns, about 50 microns, or about 40 microns. In some embodiments, the depth of the spacers can be less than or equal to about 100 microns, about 90 microns, about 80 microns, about 70 microns, about 60 microns, about 50 microns, or about 40 microns.

In some embodiments, the width in the x direction of the spacer can vary depending on the distance from the membrane in the y direction. For example, the 3D printed spacer can have at least a first width at a first distance from the membrane and a second width at a second distance from the membrane. There can be many more different widths of the spacer at many more distances from the membrane. In some embodiments, the first width of the spacer can be greater than the second width of the spacer. In some embodiments, the first distance from the membrane can be greater than the second distance from the membrane. In some embodiments, the 3D printed spacer can have a third width at a third distance from the membrane, wherein the third width of the spacer can be greater than the second width of the spacer and the third distance from the membrane can be less than the second distance from the membrane.

For example, FIG. 6C represents an hourglass type geometry that has a width W1 at a distance L1 from the membrane, a width W2 at a distance L2 from the membrane, and a width W3 at a distance L3 from the membrane. As shown in FIG. 6C, width W1 is greater than width W2 and distance L1 is greater than distance L2. In addition, width W3 is greater than width W2 and distance L2 is greater than distance L3. Such geometry of the spacer is incapable of being formed by traditional screen-printing methods.

In some embodiments, the depth in the z direction of the spacer can vary depending on the distance from the membrane in the y direction. For example, the 3D printed spacer can have at least a first depth at a first distance from the membrane and a second depth at a second distance from the membrane. There can be many more different depths of the spacer at many more distances from the membrane. In some embodiments, the first depth of the spacer can be greater than the second depth of the spacer. In some embodiments, the first distance from the membrane can be greater than the second distance from the membrane. In some embodiments, the 3D printed spacer can have a third depth at a third distance from the membrane, wherein the third depth of the spacer can be greater than the second depth of the spacer and the third distance from the membrane can be less than the second distance from the membrane.

In some embodiments, the cross sectional area of a single 3D printed spacer taken through the width of the spacer can vary depending on the distance from the membrane in the y direction. For example, the 3D printed spacer can have at least a first cross sectional area at a first distance from the membrane and a second cross sectional area at a second distance from the membrane. There can be many more cross sectional areas of the spacer at many more distances from the membrane. In some embodiments, the first cross sectional area of the spacer can be greater than the second cross sectional area of the spacer. In some embodiments, the first distance from the membrane can be greater than the second distance from the membrane. Furthermore, proper adhesion to the membrane can be maintained by increasing the area where the spacer contacts the membrane while maintaining a minimum thickness in the center section of the spacer to minimize obstruction to flow. As such, in some embodiments, the 3D printed spacer can have a third cross sectional area at a third distance from the membrane, wherein the third cross sectional area of the spacer can be greater than the second cross sectional area of the spacer and the third distance from the membrane can be less than the second distance from the membrane.

In addition, the complex shapes that are capable of being printed using Additive Manufacturing can allow for decreased flow obstruction without compromising the desired membrane separation. An additional benefit to 3D printing the spacers is that the total height of the printed spacers can be varied along the width and length of the membrane.

The spacers can also be combined with operational decisions to improve the performance of the ion-exchange systems. For example, the spacers can be designed such that they have the ability to compress and/or expand (i.e., spring-like) under the application/removal of a load. In this way, the spacers can act like a spring having a spring constant that can be used to alter the height/thickness of the fluid flow channels by manipulating the relative pressures of the product/diluate and brine streams. As such, the thickness of the product/diluate stream can be reduced by increasing the pressure of the brine stream relative to the product/diluate stream, which in turn can reduce the resistance of the product/diluate stream. Examples of spring-like spacers can be shown in FIG. 7A-D.

Figure 8A:
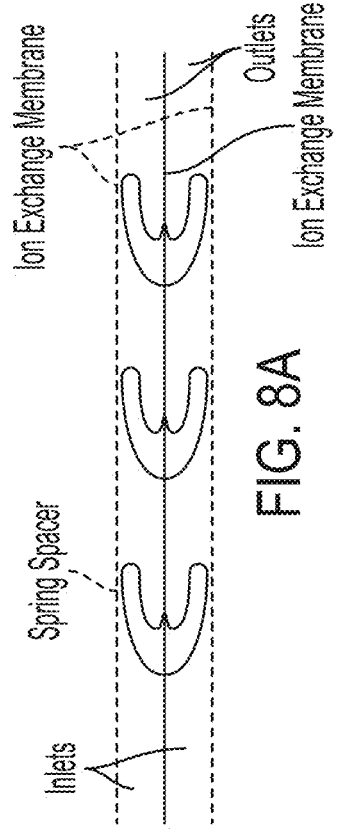
FIG. 8A illustrates an example of a cross-sectional view of membranes utilizing spring-like spacers with equal flow pressure.
Figure 8B:
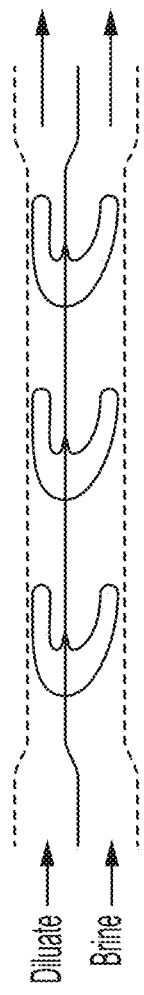
FIG. 8B illustrates an example of a cross-sectional view of membranes utilizing spring-like spacers to vary the thickness of the flow chamber through the application of pressure.

The spring-like spacers can expand or contract to fill the intermembrane gap. In some embodiments, the spacer can contact both membranes at all times to ensure proper flow distribution. In some embodiments, the spring constant of the spacers can vary such that the width of the channels can be graded throughout the length of the flow channels. In some embodiments, the spacers can have a spring constant of about 5-2000 N/m or about 20-200 N/m. In addition, the height of the spring-like spacer may be greater than the desired intermembrane gap to allow for proper expansion as pressure is applied to either the product/diluate or brine stream. For example, in some embodiments, the flows can be configured to be in a co-flow arrangement as shown in FIG. 8A-B. In the co-flow arrangement, the direction of the brine stream runs in the same direction as the product/diluate stream.

In some embodiments, equal pressure can be applied to both chambers (i.e., pressure from the brine stream=pressure from the product/diluate stream) such that the spring-like spacers allow for equal intermembrane spacing. However, in some embodiments, the brine stream can be pressurized as shown in FIG. 8B such that the beneficial differential pressure can be maintained throughout the length of the flow channels. This additional pressure can increase the intermembrane spacing in the brine flow channel as the spring-like spacers expand. Conversely, the intermembrane spacing in the product/diluate flow channel can decrease as the spring-like spacers in that channel compress. This reduction in thickness can reduce the electrical resistance attributed to the product/diluate flow channel and the electrodialysis stack.

In some embodiments, the flows of the streams can be configured in "counter flow" where the direction of the brine stream is opposite the direction of the product/diluate stream. In this configuration, the pressure drop across the length of the flow channel can be utilized to constrict the width of the product/diluate stream at the exit. This can deliver the benefit where it is most needed because the conductivity is reduced over the length of the flow channel as ions are removed from the product stream in the ion-exchange process.

In some embodiments, the spacers can be designed to allow for a greater intermembrane spacing at the inlets and/or outlets of the contained area created by the spacer border. The pressure drop associated with introducing fluid through this portion of the cell can be a significant fraction of the total pressure drop. By increasing the thickness of the spacer in the inlet, the associated pressure drop of the inlet to the active area can be reduced. In addition, as discussed above, the spacers can be such that it expands and/or contracts to produce the desired thickness in the active area of the flow chambers while maintaining a more open flow in the inlet region.

Figure 9:
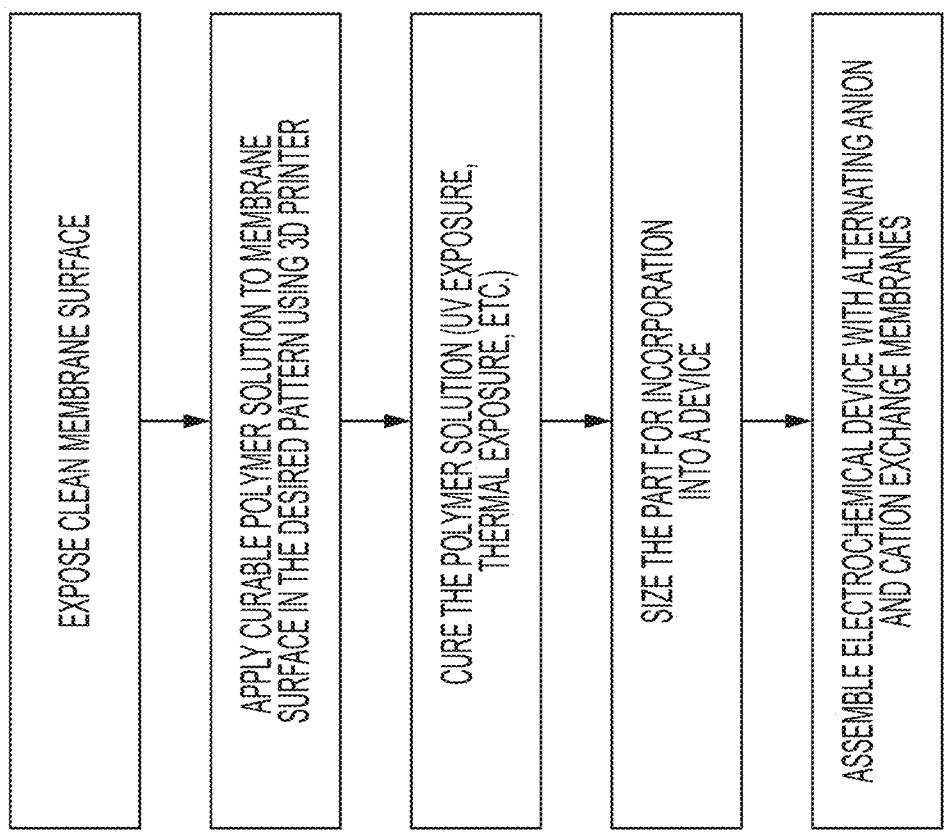
FIG. 9 illustrates an example of a flow diagram for making an ion-exchange device.

A flow diagram for making an ion-exchange device is shown in FIG. 9. After a surface of an ion exchange membrane is cleaned and exposed, a curable polymer material/solution can be applied to the exposed ion exchange membrane's surface. The desired geometry and pattern of the spacers can be created in a drawing software application and saved as a method file. The membrane can then be loaded into the 3D printer and aligned such that the printer head can apply the curable spacer material to the desired locations. Upon completion of the method file, the spacer material can be cured such that it will adhere to the ion exchange membrane surface. In some embodiments, the spacer material can be cured by irradiation with electromagnetic radiation (e.g., ultraviolet light or an electron beam) or thermal exposure. The source of radiation or heat may be any source which can provide the wavelength and/or intensity of radiation or heat necessary to cure the spacer composition.

In some embodiments, the extent to which the ion exchange membrane surface is covered by spacers (i.e., the Spacer %) may be expressed by the following equation: Spacer %=(Area of Spacers/Active Membrane Area)*100%. Area of Spacers is the area of the membrane which extends outward from the plan of the membrane on the relevant side, measured where the spacers meet the plane of the membrane (e.g., the base area of the spacers). Active Membrane Area is the total active area the relevant side of the membrane would have if it were without spacers and not textured, wherein active means the area that comes into contact with liquid when the membrane is in use (i.e., excluding the area of the membrane which forms the seal). In some embodiments, the Spacer % can be about 1-20%, about 2-15%, about 3-13%, about 4-11%, about 5-10%, about 7-9%, or about 8%. In some embodiments, the Spacer % can be about 8-13%.

This process can be repeated for all the desired ion exchange membranes (cation and anion exchange membranes) as well as additional surfaces of the desired ion exchange membranes in the ion exchange device. After printing the ion exchange membranes can be sized for incorporation into the device. The ion exchange membranes can next be arranged into an ion exchange device by alternating cation and anion exchange membranes. In some embodiments, a spacer border (with inlets to control the direction of flow) can be placed in between the cation and anion exchange membranes. In other embodiments, the spacer border can also be printed on the ion exchange membrane, thereby further reducing the number of components in the assembly and reducing complexity of the stacking procedure.

Example

In one example, a curable polymeric material is first loaded into a 3D printer. The desired printed pattern is then programmed into a method file, which is then used to deposit the polymeric material in the desired size and shape onto the membrane surface. In one exemplary case, the rectangle spacers and inter-spacer spacing is chosen to a Spacer % of 13%. This process can have the advantage of not needing a mold to form the spacers, can reduce waste of the curable polymer material, and can remove cleaning steps that accompany the use/re-use of a mold.

Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters. For example, the spacing between ion exchange membranes can be less than about 1000 microns, about 500 microns, or about 250 microns is meant to mean that the spacing between ion exchange membranes can be less than about 1000 microns, less than about 500 microns, or less than about 250 microns.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

The invention claimed is:
1. A method of forming an ion exchange membrane, comprising:
   3D printing a plurality of curable spacers on a surface of the ion exchange membrane; and curing the plurality of curable 3D printed spacers to form a plurality of 3D printed spacers on the surface of the ion exchange membrane, wherein each 3D printed spacer of the plurality of 3D printed spacers has the following properties:

a first width $W_1$ at a first distance $L_1$ from the membrane surface, a second width $W_2$ at a second distance $L_2$ from the membrane surface, $W_1 > W_2$, and $L_1 > L_2$.

2. The method of claim 1, wherein the plurality of curable 3D printed spacers is cured by electromagnetic radiation or thermal exposure.

3. The method of claim 2, wherein the electromagnetic radiation is ultraviolet light.

4. The method of claim 1, wherein each 3D printed spacer of the plurality of 3D printed spacers has the following additional properties:

a third width $W_3$ at a third distance $L_3$ from the membrane surface, $W_3 > W_2$, and $L_3 < L_2$.

5. The method of claim 1, wherein each 3D printed spacer of the plurality of 3D printed spacers have a height of 10-1000 microns.

6. The method of claim 5, wherein each 3D printed spacer of the plurality of 3D printed spacers have a height of 10-250 microns.

7. The method of claim 1, wherein a total area of the surface of the ion exchange membrane covered by the plurality of 3D printed spacers is 1-20% of total surface area of the surface of the ion exchange membrane.

8. The method of claim 1, wherein a volume of the plurality of 3D printed spacers is less than a theoretical maximum volume of the plurality of 3D spacers defined by multiplying a maximum width of the spacers in a x direction by a maximum height of the spacers in a y direction and by a maximum depth of the spacers in a z direction.

9. The method of claim 8, wherein the volume of the plurality of 3D printed spacers is less than 95% of the theoretical maximum volume of the plurality of 3D spacers.

10. The method of claim 1, further comprising 3D printing a second plurality of curable spacers on a surface of the ion exchange membrane opposite the surface with the first plurality of 3D printed spacers and curing the second plurality of curable 3D printed spacers to form a second plurality of 3D printed spacers on the surface of the ion exchange membrane opposite the surface with the first plurality of 3D printed spacers.

11. The method of claim 1, wherein ion exchange membrane is a cation exchange membrane or an anion exchange membrane.

* * * * *